3,458,402
PROCESS FOR PRODUCING AN ANTIFUNGAL
AND ANTIPROTOZOAL SUBSTANCE
Nobuhiko Komatsu, Tokyo, Japan, assignor to The Green
Cross Corporation, Osaka, Japan, a corporation of
Japan
No Drawing. Filed June 30, 1966, Ser. No. 561,823
Claims priority, application Japan, June 30, 1965,
40/39,485
Int. Cl. C12d 13/00, 1/00
U.S. Cl. 195—81                    6 Claims

ABSTRACT OF THE DISCLOSURE 4-($\omega$-hydroxyacetyl) - 8 - hydroxy-isocoumarin is produced by culturing Trametes at a pH lower than 7 in a medium containing sources of carbon, nitrogen, inorganic salts and extracts of animal and plant bodies for about 10–20 days at a temperature of about 20 to 30° C. The compound 4-($\omega$-hydroxyacetyl) - 8 - hydroxy-isocoumarin which exhibits antimicrobial activity against fungi and protozoa is extracted from the culture filtrate by chloroform or ethylacetate.

---

The present invention relates to a process for producing an antifungal and antiprotozoal substance. More particularly, the present process comprises growing the mycelia of a mushroom belonging to family polyporaceae of Basidiomycetes, for example. *Trametes albida* of genus trametes or a variant or a mutant thereof in a suitable nutrient medium and efficiently obtaining the antifungal and antiprotozoal substance accumulated therein.

The substance is 4-($\omega$-hydroxyacetyl)-8-hydroxy-isocoumarin, which is obtained by growing *Oospora astringenes*, and called "Oosponol."

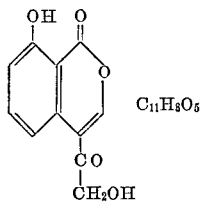

$C_{11}H_8O_5$ (Ref. to Isao Yamamoto: Agr. Biol. Chem. 25, 400–404, 1961, 26, 486–493, 1962.)

However, the present substance is obtained with a low yield by growing *Oospora astringenes* belonging to fungi imperfecti, Chem. Abst. vol. 59–4441, 1963, but it is obtained in a shorter period of culture and with a higher yield by growing *Trametes albida* as compared with the former.

Refer to: Patent Publication No. 9441/64 36H-32–30A-3).

The classification of fungi is rather complicated; and sometimes, they possess a few different nomenclatures. *Trametes albida* possesses two other nomenclatures as follows:

*Lenzites albida* Fr.: Syll. Fungs, 5, 639, 1887.

*Coriolellus kusanoi* Murr: Mycologia, 1, 165, 1909.

The present specification conforms to the classification described in "Mycological Flora of Japan," vol. 2, written by Seiya Ito and published by Yokendo (Tokyo, Japan) in 1955.

The present invention has been completed on the basis of the above-mentioned findings and essentially consists in growing the mycelia of a mushroom belonging to *Trametes albida*, genus Trametes, family Polyporaceae of Basidiomycetes or a variant or a mutant thereof. In the process of the present invention, nutrient sources employed are digestible and assimilable sources of carbon, nitrogen, inorganic salts and extracts from animal and plant bodies in suitable proportions. For example, as carbon sources glucose, maltose, lactose and sucrose may be employed starch and their concentrations can be varied within a range not inhibiting the growth of fungi (about 30 w./v. percent against the whole volume of culture medium). Higher yields are obtained by the use of monosaccharides and disaccharides which are preferred to polysaccharides. As nitrogen sources, peptone, amino acids and the like may be employed and as inorganic salts magnesium, calcium, iron, manganese, zinc, or copper salts other than phosphates and phosphates of other metals. When the extracts from plant bodies are employed as carbon sources, trace elements such as Fe, Mn, Zn, Cu and the like are not essential. As examples of the extracts from animal and plant bodies, malt extract, bran extract, cotton seed extract, yeast extract, meat extract and the like are useful. Other nutrient sources may be employed which do not inhibit the production and accumulation of the desired substance. The culture conditions including culture medium, temperature, period and the like may be suitably controlled according to the strain used and are selected to effect the optimum production of the desired substance. However, in the usual submerged cultures, it is suitable to have the pH of the medium regulated in the range of 2.0–6.0 and a culture period of 1–4 weeks at 20–30° C.

The pH of the culture medium is a particularly important factor for the production of the desired substance. At the start of the culture, the pH of the medium may be about 6.0 and culturing is conducted by naturally or artificially lowering the pH to maintain a pH below 7 because the substance is not produced above pH 7.

The desired substance may be obtained and purified from the culture medium directly or from the culture filtrate obtained by separating solid matters by filtration. The isolation of the desired substance may be carried out by the fractionation methods based on the difference of physico-chemical properties between the desired substance and undesired ones, including the processes of dissolution, precipitation, filtration, elution, separation, partition between two liquid phases and the like, which may be suitably combined and repeatedly practiced.

The antimicrobial activities of the desired substance against micro-organisms, particularly against fungi and yeasts, were measured with Sabouraud's agar plates and

| Strain | Culture medium | Method of culture | Culture period (days) | Yield (mg./l.) |
|---|---|---|---|---|
| *Trametes albida* | Glucose 2%, peptone 0.25%, malt extract 2%. | Shaking culture | 10–20 | 50–70 |
| *Oospora astringenes* | Glucose 4%, peptone 0.1%, malt extract 2%. | Settling culture | 25–30 | 2.5–5.0 |
| Do | Glucose 5%, corn steep liquor 1%, yeast extract 0.5%. | Tank culture | 8 | (¹) |

¹ Small amount.

the results are shown by the minimum growth inhibitory concentrations in Table 1. The concentrations in the table are represented as the amounts of the desired substance in μg. per ml. of the medium.

Table 1.—Antimicrobial activities against fungi and yeasts

| Test micro-organisms: | Minimum inhibitory concentrations (μg./ml.) |
|---|---|
| Candida albicans | 25 |
| Helminthosporium sigmoideum | 3.12 |
| Trichophyton mentagrophytes | 50 |
| Histoplasma capsulatum | 12.5 |
| Saccharomyces cerevisiae | 50 |
| Cryptococcus neoformans | 25 |
| Piricularia oryzae | 25 |

The growth inhibitory activity of the desired substance against protozoa, *Trichomonas vaginalis* was measured in a liquid medium with the aid of a microscope and the result is shown in Table 2.

Table 2.—Growth inhibitory activity against protozoa

Test micro-organism, *Trichomonas vaginalis*
Minimum inhibitory concentration (μg./ml.), 12.5

The results in Tables 1 and 2 clearly indicate remarkable antibiotic activities of the desired substance against fungi, yeasts, and protozoa.

Example 1

An aqueous culture medium prepared with distilled water, containing 4% of glucose, 1% of peptone, 0.05% of potassium dihydrogen phosphate, and 0.02% of magnesium sulfate, was divided into several portions of 100 ml. each. Each portion was placed in a 500 ml. Sakaguchi's shaking flask and was sterilized at 110° C. for 20 min. In this medium, the mycelia of *Trametes albida* belonging to genus Trametas of family Polyporaceae was inoculated and cultured with shaking at 25–28° C., pH of the medium being kept at 2–5. About 7 days after inoculation, the amount of the mycelia was abundant. The production of the desired substance in the culture medium was checked by aseptically sampling a part of the medium and testing by cup method (by the diameter of growth inhibitory zone) with Sabouraud's agar plates, using *Candida albicans* 3147 strain as test micro-organism.

The maximum accumulation of the desired substance was usually attained after about 20 days of culture. Then, the culture medium was filtered and the resulting filtrate was extracted with almost an equal volume of ethyl acetate or chloroform. Subsequently, the extract was concentrated under reduced pressure to yield oily residue. The residue was washed with a small amount of petroleum ether and dissolved in chloroform.

The solution was passed through a column packed with purified silica gel, which had been treated with chloroform. The desired substance adsorbed by silica gel was eluted with chloroform or chloroform-methanol (9:1) mixture. The factor of activities was measured by cup method after elution and the active eluates were combined and concentrated to obtain crystals of the desired substance. The yield was about 50 mg. per 1 of the cultured solution.

Example 2

An aqueous culture medium (20 l.) prepared with tap water, containing 2% of malt extract and 5% of glucose, was placed in a 30 l. culture tank. The culture medium was sterilized with high pressure steam by the usual method. Then, in this medium was inoculated 0.8 l. of the mycelial suspension obtained by the shake-culture of *Trametas albida* belonging to genus trametes of family Polyporaceae. The medium was cultured at 28±1° C. with aeration of 15 l./min. and agitation of 200–250 r.p.m. About 10 days after inoculation, the desired substance was accumulated in the culture solution. The process of the successive isolation was the same as in Example 1. The yield was about 70 mg. per l. of the culture medium.

What is claimed is:

1. A process for producing an antifungal and antiprotozoal substance which comprises culturing mycelia of *Trametes albida*, a mutant or a variant thereof in a medium containing digestible and assimilable sources of carbon, nitrogen, inorganic salts and extracts from animal or plant bodies as nutrient sources and controlling pH of the medium lower than 7 to accumulate 4-(ω-hydroxyacetyl)-8-hydroxy-isocoumarin in the medium and isolating said substance therefrom.

2. A process according to claim 1, wherein the said source of carbon is a member selected from the group consisting of starch, glucose, maltose, lactose, and sucrose, and a maximum concentration of the source is about 30 w./v. percent against the whole volume of culture medium.

3. A process according to claim 1, wherein the said source of nitrogen is a member selected from the group consisting of peptone, amino acids.

4. A process according to claim 1, wherein the said source of inorganic salts is selected from the group consisting of (a) non-phosphate salts of magnesium, calcium, iron, manganese, zinc and copper and (b) phosphates with metals other than those of (a).

5. A process according to claim 1, wherein the said source of extracts from plant bodies is a member selected from malt extract, bran extract, cotton seed extract and yeast extract.

6. A process according to claim 1, wherein pH of the culture medium is about 6.0 at the beginning of culture and lowered as the culture proceeds.

References Cited

Chemical Abstracts, vol 59, p. 4441(b), 1963.

MAURICE W. GREENSTEIN, Primary Examiner

U.S. Cl. X.R.

195—80